United States Patent
Kojo et al.

(10) Patent No.: US 6,199,654 B1
(45) Date of Patent: Mar. 13, 2001

(54) VEHICLE STEERING APPARATUS

(75) Inventors: Takahiro Kojo; Junji Kawamuro; Morihiro Matsuda, all of Susono; Masahiko Shindo, Shizuoka-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/060,264

(22) Filed: Apr. 15, 1998

(30) Foreign Application Priority Data

Jun. 4, 1997 (JP) .................................................. 9-146691
Sep. 9, 1997 (JP) .................................................. 9-244267

(51) Int. Cl.⁷ ...................................................... B62D 5/04
(52) U.S. Cl. .............................................................. 180/443
(58) Field of Search ........................ 280/93.502, 93.513; 180/443, 444, 446, 431

(56) References Cited

U.S. PATENT DOCUMENTS

| | | | | |
|---|---|---|---|---|
| 2,109,418 | * | 2/1938 | Fuller | 180/79.1 |
| 3,668,946 | * | 6/1972 | Fahey et al. | 74/640 |
| 4,570,734 | * | 2/1986 | Taig | 180/79.1 |
| 4,582,155 | * | 4/1986 | Ohe | 180/79.1 |
| 4,921,061 | * | 5/1990 | Asano | 180/79.1 |
| 5,078,665 | * | 1/1992 | Castellani | 475/342 |
| 5,267,625 | * | 12/1993 | Shimizu | 180/79.1 |
| 5,470,283 | * | 11/1995 | Seidou | 475/162 |
| 5,631,511 | * | 5/1997 | Schulmann et al. | 310/83 |
| 5,925,082 | * | 7/1999 | Shimizu et al. | 701/41 |

FOREIGN PATENT DOCUMENTS

| | | |
|---|---|---|
| 3830654 A1 | 11/1989 | (DE) . |
| 0 480 159 A1 | 4/1992 | (EP) . |
| 62-20755 | 1/1987 | (JP) . |
| 3-153467 | 7/1991 | (JP) . |

\* cited by examiner

*Primary Examiner*—Kevin Hurley
*Assistant Examiner*—Kevin McKinley
(74) *Attorney, Agent, or Firm*—Oliff & Berridge, PLC

(57) ABSTRACT

In a vehicle steering apparatus having a variable gear ratio unit arranged midway along a steering transmission system for connecting a steering wheel and tires to change the transmission ratio, and an ECU for variably controlling the variable gear ratio unit in accordance with the state of a vehicle, the variable gear ratio unit includes a motor controlled by the ECU, and a reducing mechanism which has a transmission ratio for allowing to maintain the steering angle of the steering wheel with respect to an RF reverse input and transmits the rotation of the motor to the output side. Even if a reverse input acts from a tire side during traveling, the relationship between the steering amount of the steering wheel and the turning amount of the tire can be kept unchanged.

9 Claims, 7 Drawing Sheets

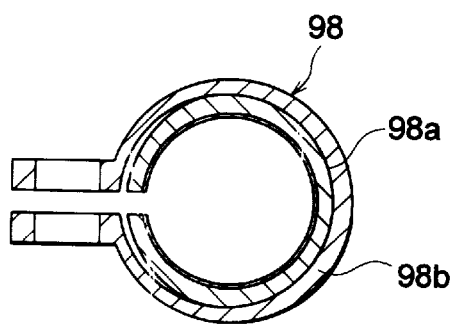
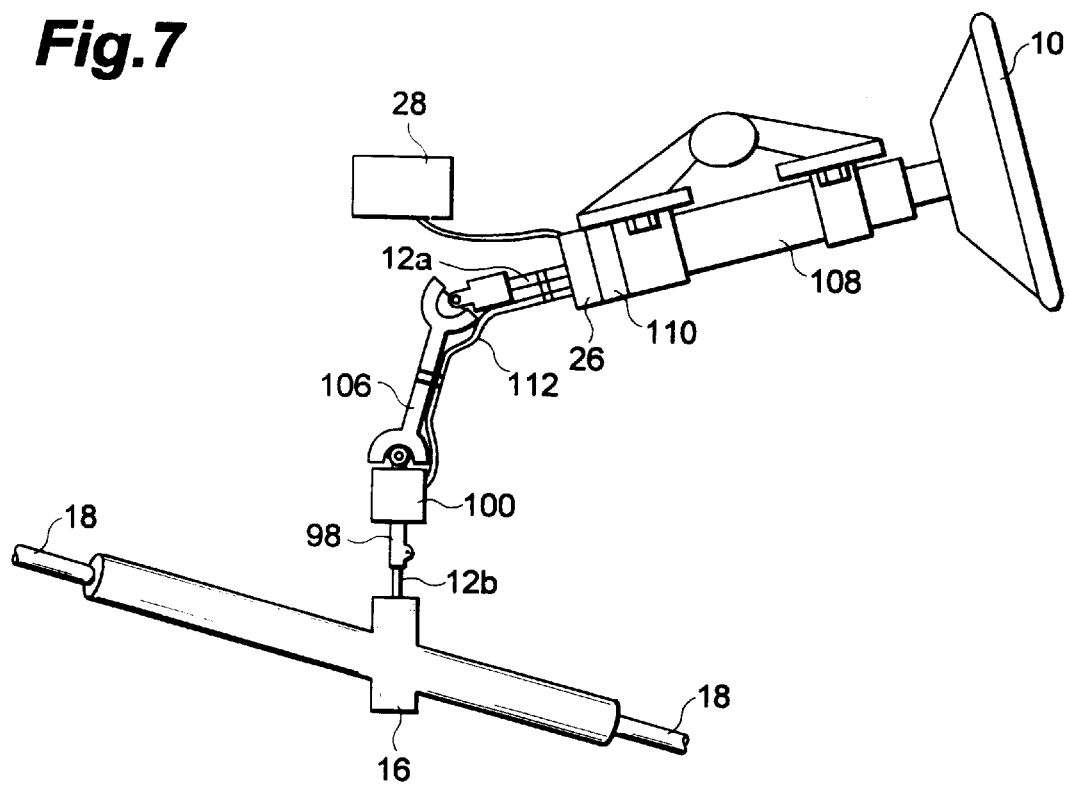

VEHICLE STEERING APPARATUS

BACKGROUND OF THE INVENTION

1. Field of the Invention

The present invention relates to a vehicle steering apparatus capable of changing a transmission ratio of the steering angle of a steering wheel to the turning angle of a tire.

2. Related Background Art

A steering apparatus disclosed in Japanese Patent Laid-Open No. 3-153467 is available as a conventional steering apparatus capable of changing the transmission ratio of the steering angle of the steering wheel to the turning angle of the tire. This steering apparatus comprises a transmission ratio change mechanism constituted by a planetary gear differential mechanism mounted on a steering shaft between a steering wheel and a pinion connected to a tire.

The transmission ratio change mechanism of this steering apparatus is of a differential type. For this reason, when an excessive reverse input acts from a vehicle wheel or tire during traveling, this reverse input moves the transmission ratio change mechanism to change the relationship between the steering amount of the steering wheel and the turning amount of the tire.

SUMMARY OF THE INVENTION

It is an object of the present invention to provide a vehicle steering apparatus capable of maintaining the relationship between the steering amount of a steering wheel and the turning amount of a tire even if an excessive reverse input acts during traveling.

In order to achieve the above object according to the present invention, there is provided a vehicle steering apparatus comprising transmission ratio change means arranged midway along a steering transmission system for connecting a steering wheel and a turned wheel, and control means for variably controlling the transmission ratio change means in accordance with a state of a vehicle, the transmission ratio change means comprising:

a motor whose rotation is controlled by the control means, and a reducing mechanism for reducing a rotation speed of the motor, wherein a housing for the motor and an reduction output terminal of the reducing mechanism are connected to the steering transmission system.

The reducing mechanism desirably has a high reduction ratio enough to decrease a phase shift amount between a steering angle of the steering wheel and a turning angle of the turned wheel with respect to a force reversely input from the turned wheel through the steering transmission system to be less than a predetermined value.

With this arrangement, the apparent motor inertia viewed from the turned wheel side can be increased, and a phase shift amount by an RF reverse input (kick back) can be decreased.

A connection portion for connecting the transmission ratio change means to the steering transmission system preferably comprises a cylindrical yoke fixed to the body of the transmission ratio change means for coupling the transmission ratio change means to the steering transmission system, and holding means for holding a coupled state between the cylindrical yoke and the steering transmission system, wherein the holding means is detachably mounted on an outer circumferential surface of the cylindrical yoke.

With this arrangement, a wire component for supplying power from a body side to the transmission ratio change means can be disposed on an outer circumferential surface of the cylindrical yoke between the holding means and the body of the transmission ratio change means. The wire component can be made compact, compared to the case wherein the wire component is disposed outside the body of the transmission ratio change means.

The wire component for supplying power from a body side to the transmission ratio change means may be disposed at a column portion supporting a steering shaft of the steering transmission system.

Since the wire component is separated from the transmission ratio change means, the transmission ratio change means can be made compact, and particularly the size in the axis direction can be reduced.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a sectional view of the variable gear ratio unit (FIG. 5) of the vehicle steering apparatus according to the fourth embodiment of the present invention along the line A—A;

FIG. 7 is a view showing the structure of a vehicle steering apparatus according to the fifth embodiment of the present invention.

DESCRIPTION OF THE PREFERRED EMBODIMENTS

A vehicle steering apparatus according to the first embodiment of the present invention will be described with reference to FIGS. 1 and 2.

Figure 1:
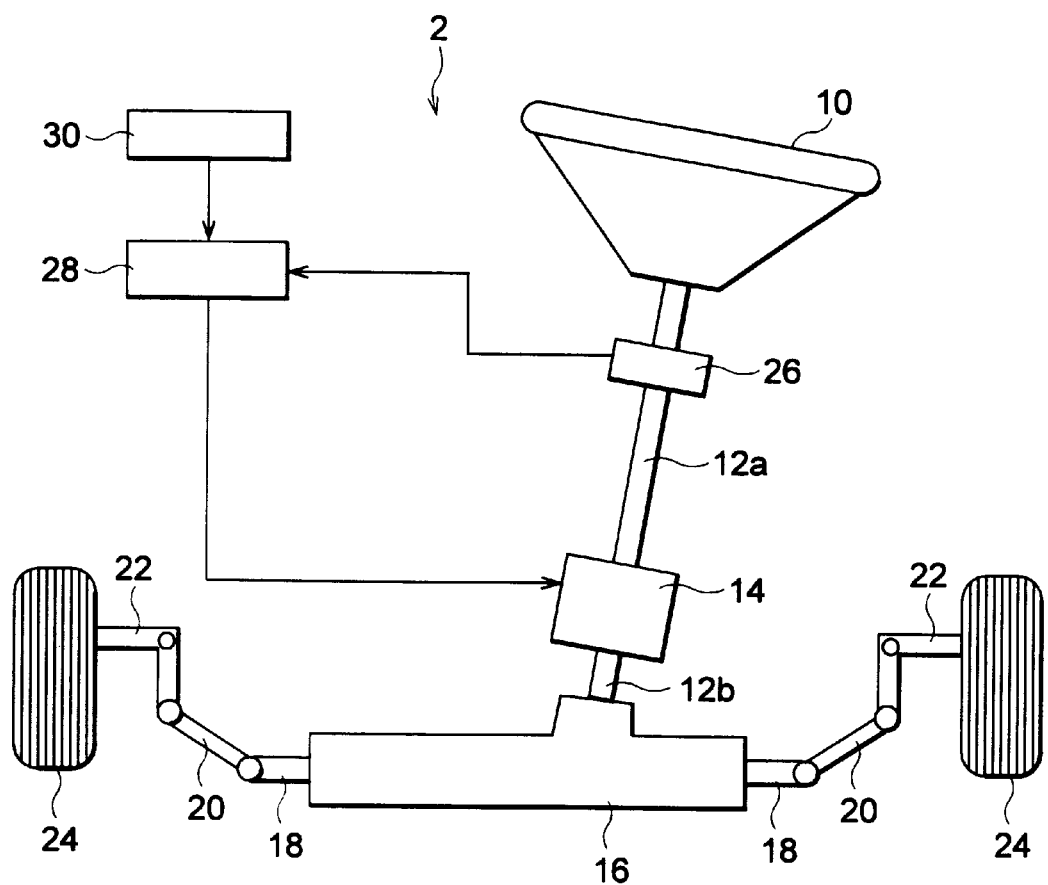
FIG. 1 is a view showing the structure of a vehicle steering apparatus according to the first embodiment of the present invention.

FIG. 1 is a view showing the structure of a vehicle steering apparatus 2. In FIG. 1, reference numeral 10 denotes a steering wheel. This steering wheel 10 is connected to the upper end of an upper steering shaft 12a. The lower end of the upper steering shaft 12a is connected to a variable gear ratio unit 14 serving as a transmission ratio change means. The upper end of a lower steering shaft 12b is connected to the variable gear ratio unit 14.

A pinion (not shown) is mounted on the lower end of the lower steering shaft 12b. This pinion meshes with a rack bar 18 in a steering gear box 16. The steering gear box 16 incorporates a power steering unit (not shown) and the like. Each of the two ends of the rack bar 18 is connected to one end of a corresponding one of tie rods 20. The other end of each tie rod 20 is connected to a corresponding one of tires 24 through a corresponding one of knuckle arms 22.

A steering angle sensor 26 for detecting the steering angle of the steering wheel 10 is mounted on the upper steering shaft 12a. The steering angle of the steering wheel 10 detected by the steering angle sensor 26 is input to an ECU (Electronic Control Unit) 28. The ECU 28 also receives a vehicle speed output from a vehicle speed sensor 30 for detecting the vehicle speed. The ECU 28 outputs a control signal for controlling the variable gear ratio unit 14 to the variable gear ratio unit 14.

Figure 2:
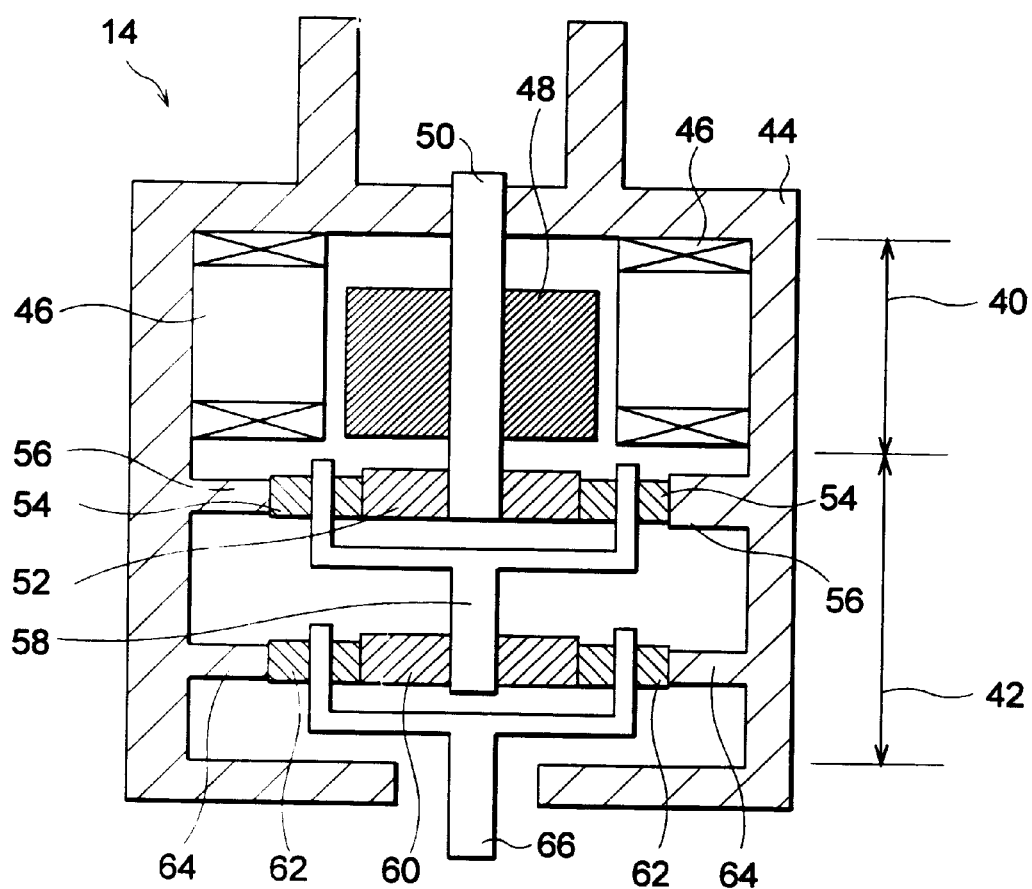
FIG. 2 is a cross section showing the structure of the variable gear ratio unit of the vehicle steering apparatus according to the first embodiment of the present invention.

As shown in FIG. 2, the variable gear ratio unit 14 comprises a motor 40 and a reducing unit 42. The motor 40 comprises a stator 46 and a rotor 48 which are mounted in a motor case 44. The reducing unit 42 is constituted by two planetary gear mechanisms. More specifically, a rotating shaft 50 rotating together with the rotor 48 is fixed to a sun gear 52 constituting the first planetary gear mechanism, and a planet gear 54 meshes with the sun gear 52 and a ring gear 56 formed on the inner circumferential surface of the motor case 44. The planet gear 54 is rotatably attached to a carrier 58.

The carrier 58 is fixed to a sun gear 60 constituting the second planetary gear mechanism, and a planet gear 62 meshes with the sun gear 60 and a ring gear 64 formed on the inner circumferential surface of the motor case 44. The planet gear 62 is rotatably attached to a carrier 66.

The motor case 44 on the motor 40 side is connected to the lower end of the upper steering shaft 12a through a universal joint (not shown). The carrier 66 is connected to the upper end of the lower steering shaft 12b.

In this vehicle steering apparatus 2, when the vehicle speed detected by the vehicle speed sensor 30 and the steering angle detected by the steering angle sensor 26 are input to the ECU 28, the ECU 28 calculates a target turning angle on the basis of the vehicle speed and the steering angle and outputs a control signal to the variable gear ratio unit 14 on the basis of the target turning angle. The motor 40 in the variable gear ratio unit 14 is driven on the basis of this control signal to supply a turning angle corresponding to the target turning angle to the tire 24.

In this vehicle steering apparatus 2, even if a reverse input acts from the tire 24 side during traveling, the relationship between the steering amount of the steering wheel 10 and the turning amount of the tire 24 can be kept unchanged. More specifically, a phase shift amount (shift from the target turning angle) by the reverse input can be calculated from expression (1) described below. This phase shift amount is small because the reducing unit 42 in the variable gear ratio unit 14 has the two planetary gear mechanisms connected each other, and thus the motor transmission ratio is high.

$$S \propto \frac{Et \times Tk}{Rm^2 \times Im} \quad (1)$$

S: phase shift amount (shift from target turning angle)
Et: transmission ratio input efficiency
Tk: kick back torque
Rm: motor transmission ratio
Im: motor inertia Note that the motor transmission ratio in expression (1) is determined by "motor transmission ratio=(input rotation speed of reducing unit)/(output rotation speed of reducing unit)".

In other words, since the reduction ratio of the reducing unit 42 viewed from the motor side is high, the apparent motor inertia viewed from the tire 24 side becomes large. Even if an RF reverse input (kick back) acts from the tire 24 side, the phase shift amount by the reverse input can be maintained very low.

Figure 3:
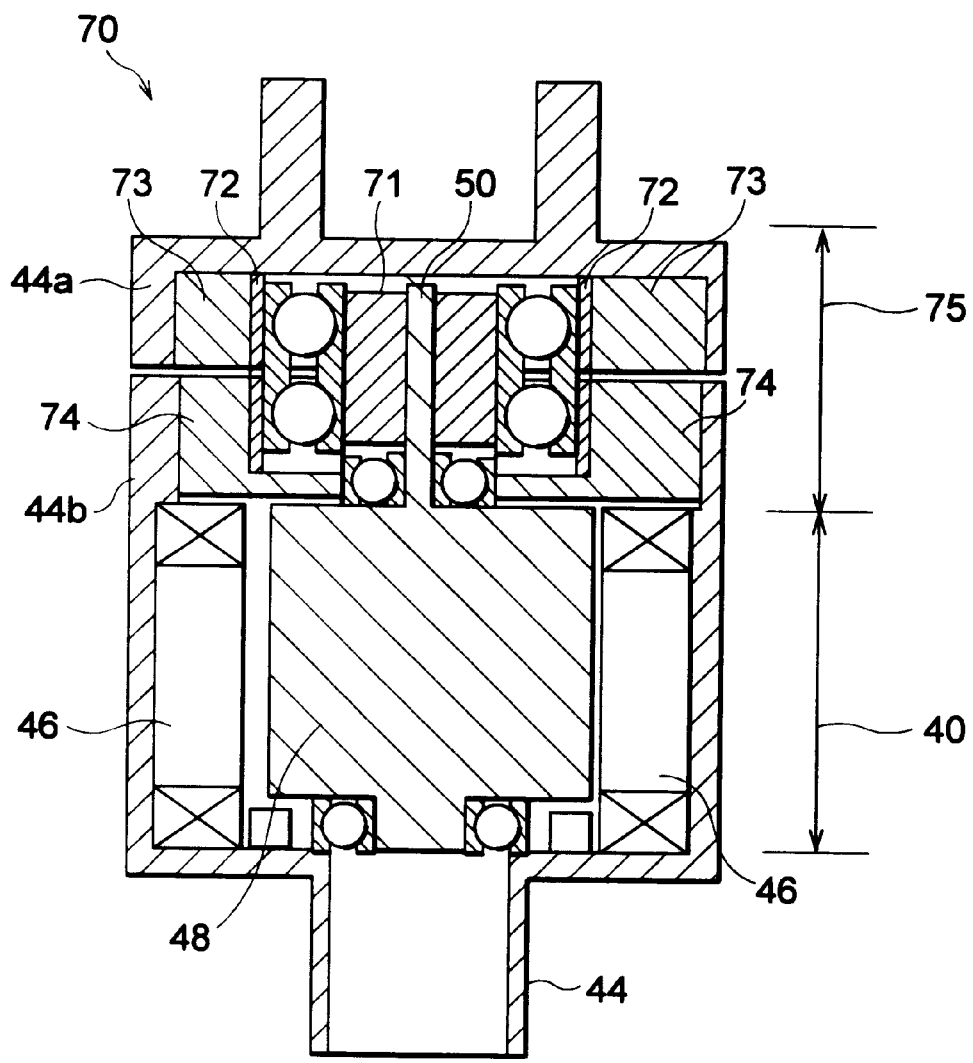
FIG. 3 is a cross section showing the structure of the variable gear ratio unit of a vehicle steering apparatus according to the second embodiment of the present invention.

A vehicle steering apparatus according to the second embodiment of the present invention will be described with reference to FIG. 3. This vehicle steering apparatus is different from that of the first embodiment in that the variable gear ratio unit 14 of the vehicle steering apparatus of the first embodiment is replaced with a variable gear ratio unit 70. Note that the same reference numerals as in the variable gear ratio unit 14 of the first embodiment denote the same parts in the variable gear ratio unit 70 of the vehicle steering apparatus of the second embodiment, and a detailed description thereof will be omitted.

This variable gear ratio unit 70 employs a harmonic drive reducing unit 75 as a reducing unit. The harmonic drive reducing unit 75 is an example of harmonic drive reducing units. The harmonic drive reducing unit 75 is a reducing unit comprising a wave generator, a flexible spline, and a circular spline as its basic members. More specifically, a wave generator 71 is composed of an elliptical cam and a ball bearing disposed around the elliptical cam and fixed to a rotating shaft 50 rotating together with a rotor 48. A flexible spline 72 is a metal flexible member having teeth on its outer circumferential portion. A rigid circular spline 73 has a ring-like shape fixed to the inner circumferential surface of an upper motor case 44a and has the same number of teeth as those of the flexible spline 72 at the same pitch as that of the teeth of the flexible spline 72. A rigid circular spline 74 has a ring-like shape fixed to the inner circumferential surface of a lower motor case 44b and has teeth larger in number by two than the teeth of the flexible spline 72 at the same pitch as that of the teeth of the flexible spline 72.

In the harmonic drive reducing unit 75, when the wave generator 71 is rotated by rotation of a rotor 48, the flexible spline 72 flexibly deforms to sequentially change meshing positions with the circular splines 73 and 74, and the rotation of the wave generator 71 is transmitted to the circular splines 73 and 74. In this case, the circular spline 73 rotates at the same speed as that of the wave generator 71. On the other hand, the circular spline 74 rotates with a delay by two teeth every rotation of the wave generator 71, and operates as a reducing unit.

Note that in this variable gear ratio unit 70, the motor case 44a on the harmonic drive reducing unit 75 side is connected to the lower end of an upper steering shaft 12a through a universal joint (not shown). The motor case 44b on the motor 40 side is connected to the upper end of a lower steering shaft 12b.

In the harmonic drive reducing unit 75, since the transmission ratio, i.e., the reduction ratio can be set high, the apparent motor inertia viewed from the tire side becomes large. Even if a reverse input acts from a tire 24 side during traveling, the relationship between the steering amount of a steering wheel 10 and the turning amount of the tire 24 can be kept unchanged, similar to the first embodiment. With the use of the harmonic drive reducing unit 75, the variable gear ratio unit 70 itself can be made compact because the reducing unit portion of the variable gear ratio unit can be made compact.

Figure 4:
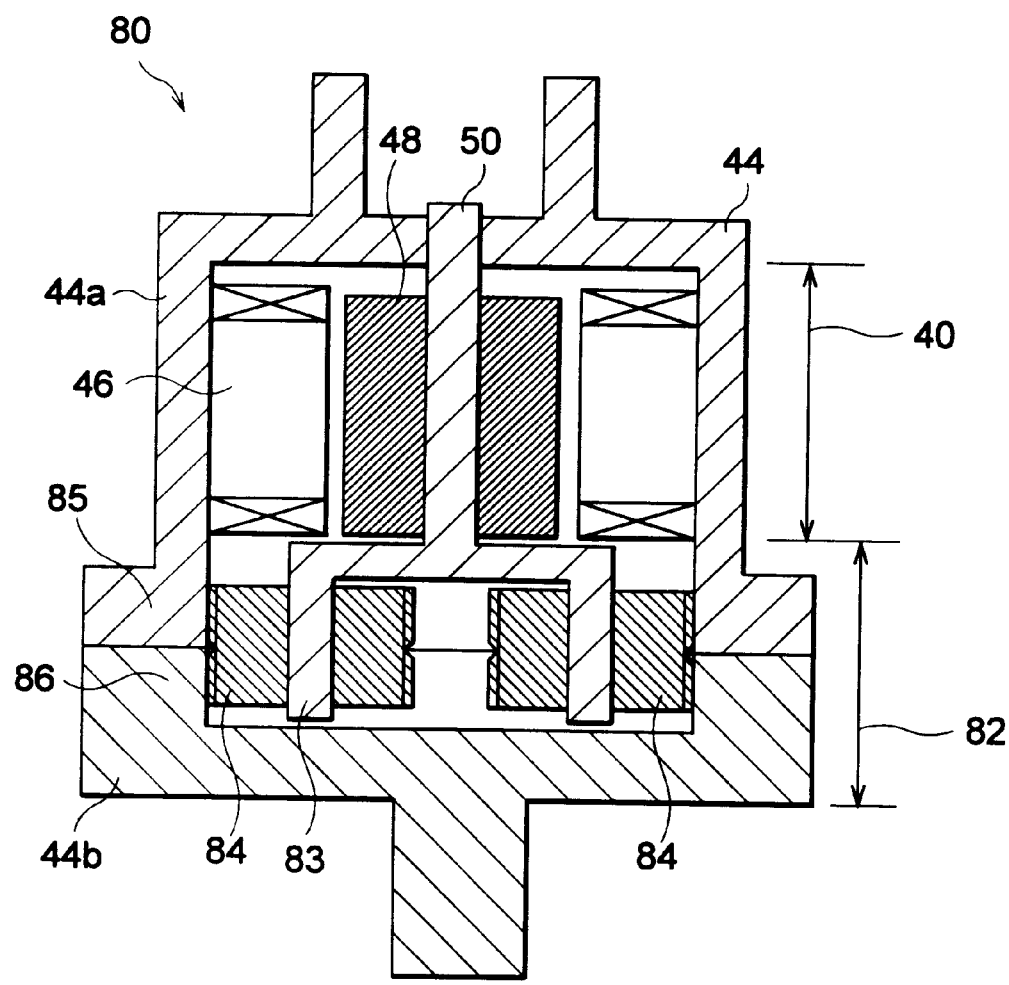
FIG. 4 is a cross section showing the structure of the variable gear ratio unit of a vehicle steering apparatus according to the third embodiment of the present invention.

A vehicle steering apparatus according to the third embodiment of the present invention will be described with reference to FIG. 4. This vehicle steering apparatus is different from that of the first embodiment in that the variable gear ratio unit 14 of the vehicle steering apparatus of the first embodiment is replaced with a variable gear ratio unit 80. Note that the same reference numerals as in the variable gear ratio unit 14 of the first embodiment denote the same parts in the variable gear ratio unit 80 of the vehicle steering apparatus of the third embodiment, and a detailed description thereof will be omitted.

The variable gear ratio unit 80 comprises a reducing unit 82 constituted by a differential mechanism using a planet gear. More specifically, a rotating shaft 50 rotating together with a rotor 48 is fixed to a carrier 83, which is rotatably attached to a planet gear 84. The planet gear 84 has a portion meshing with a ring gear 85 formed on the inner circumferential surface of an upper motor case 44*a*, and a portion meshing with a ring gear 86 formed on the inner circumferential surface of a lower motor case 44*b*. The number of teeth formed at the portion where the planet gear 84 meshes with the ring gear 85 is equal to that formed at the portion where the planet gear 84 meshed with the ring gear 86.

The ring gear 85 formed on the inner circumferential surface of the upper motor case 44*a* has teeth smaller in number by two than the teeth of the ring gear 86 formed on the inner circumferential surface of the lower motor case 44*b*. Therefore, the ring gear 86 rotates with a delay by two teeth every rotation of the ring gear 85, and operates as a reducing unit.

Note that in this variable gear ratio unit 80, the upper motor case 44*a* is connected to the lower end of an upper steering shaft 12*a* through a universal joint (not shown). The lower motor case 44*b* is connected to the upper end of a lower steering shaft 12*b*.

In the reducing unit 82, the transmission ratio, i.e., the reduction ratio can be set high. For this reason, even if a reverse input acts from a tire 24 side during traveling, the relationship between the steering amount of a steering wheel 10 and the turning amount of the tire 24 can be kept unchanged, similar to the first embodiment. According to this embodiment, a high reduction ratio can be attained, and the motor can be made compact by employing a low-torque, high-rotation, small-size motor.

Figure 5:
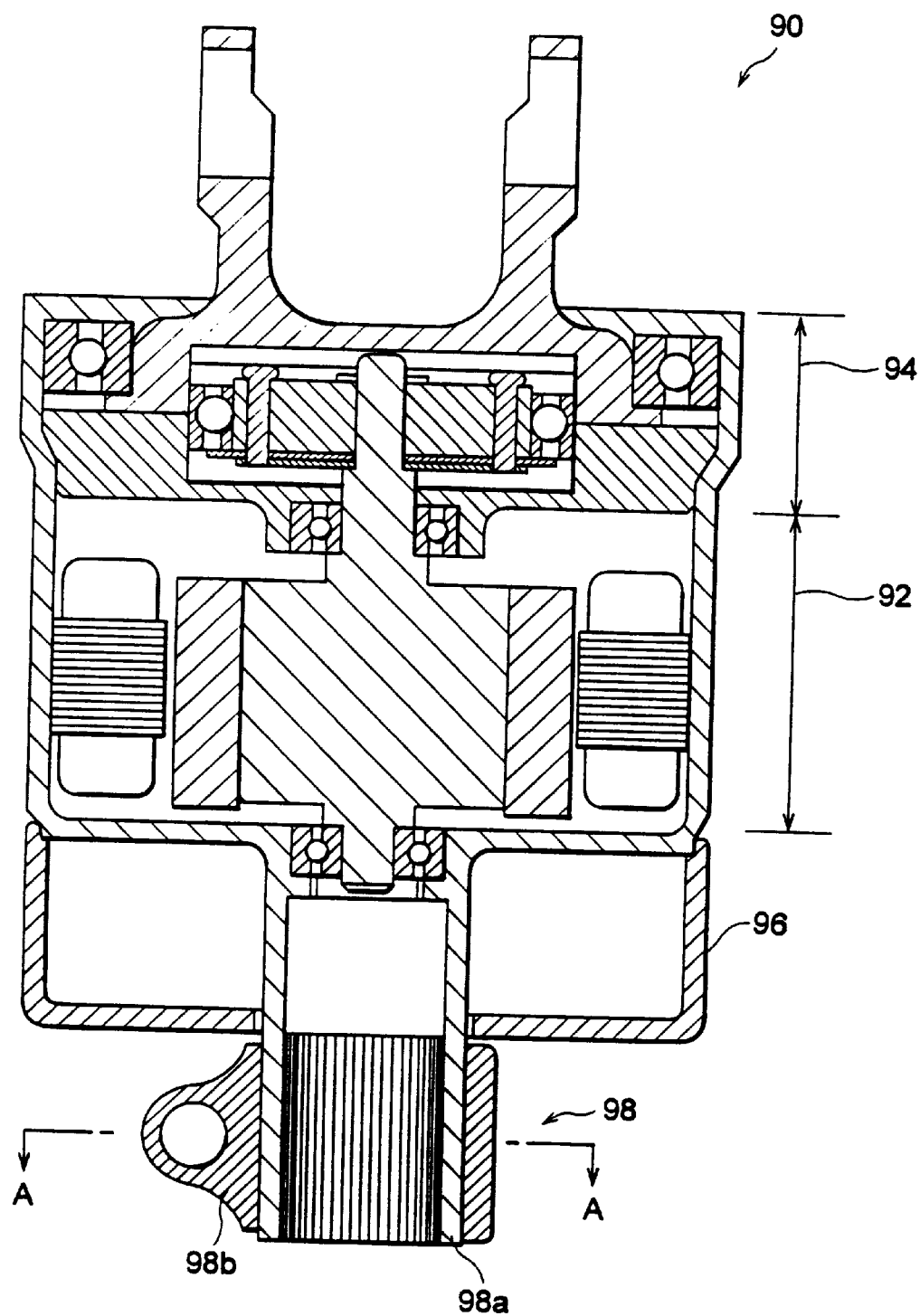
FIG. 5 is a cross section showing the structure of the variable gear ratio unit of a vehicle steering apparatus according to the fourth embodiment of the present invention.

A vehicle steering apparatus according to the fourth embodiment of the present invention will be described with reference to FIGS. 5 and 6. This vehicle steering apparatus is different from that of the first embodiment in that the variable gear ratio unit 14 of the vehicle steering apparatus of the first embodiment is replaced with a variable gear ratio unit 90. Note that the same reference numerals as in the variable gear ratio unit 14 of the first embodiment denote the same parts in the variable gear ratio unit 90 of the vehicle steering apparatus of the fourth embodiment, and a detailed description thereof will be omitted.

The variable gear ratio unit 90 comprises a motor 92, a reducing unit 94, and a spiral cable 96. The spiral cable 96 is a shielded spiral wire for supplying power from a body side to the motor 92. A connection portion 98 for connecting the variable gear ratio unit 90 to a lower steering shaft 12*b* is mounted on the side where the spiral cable 96 of the variable gear ratio unit 90 is disposed.

The connection portion 98 is made up of a cylindrical yoke 98*a* arranged integrally with the motor case and having longitudinal grooves on its inner circumferential surface, and a clamp 98*b* at the outer circumferential portion of the yoke 98*a* for maintaining the coupled state between the yoke 98*a* and the lower steering shaft 12*b*.

In this variable gear ratio unit 90, after the spiral cable 96 is slid onto the yoke 98*a*, the yoke 98*a* and the lower steering shaft 12*b* are fixed by the clamp 98*b*. The outer diameter of the cylindrical yoke 98*a* can be made equal to the inner diameter of the spiral cable 96. Accordingly, the inner diameter of the spiral cable 96 can be set small, so that the outer diameter of the spiral cable 96 can also be set small for the same allowable operation rotation number.

A vehicle steering apparatus according to the fifth embodiment of the present invention will be described with reference to FIGS. 7 and 8. This vehicle steering apparatus is different from that of the first embodiment in that the variable gear ratio unit 14 of the vehicle steering apparatus of the first embodiment is replaced with a variable gear ratio unit 100. Note that the same reference numerals as in the vehicle steering apparatus 2 of the first embodiment denote the same parts in the vehicle steering apparatus of the fifth embodiment, and a detailed description thereof will be omitted.

Figure 8:
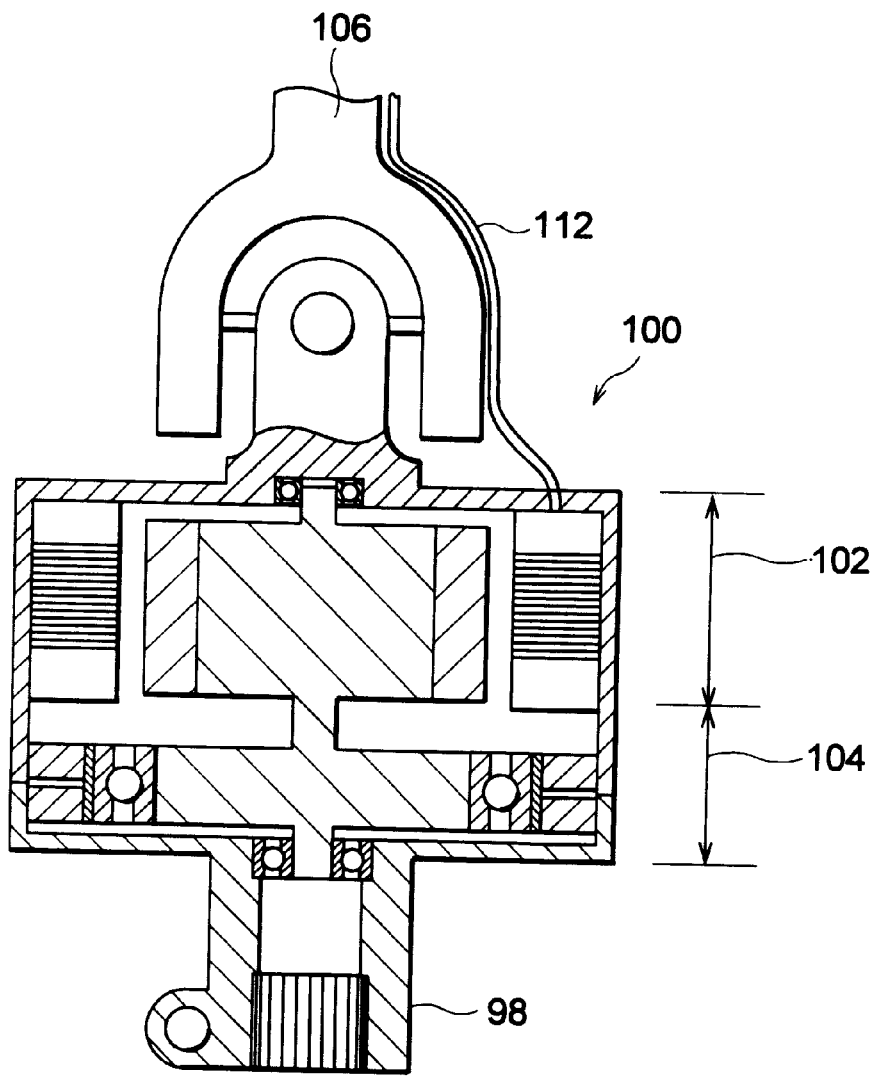
FIG. 8 is a cross section showing the structure of the variable gear ratio unit of the vehicle steering apparatus according to the fifth embodiment of the present invention.

As shown in FIG. 8, the variable gear ratio unit 100 comprises a motor 102 and a reducing unit 104. A motor case on the motor 102 side is connected to an upper steering shaft 12*a* through a universal joint 106. A connection portion 98 on the reducing unit 104 side is connected to a lower steering shaft 12*b*. A spiral cable 110 for supplying power from a body side to the variable gear ratio unit 100 is mounted on a column portion 108 supporting the upper steering shaft 12*a*. The spiral cable 110 and the variable gear ratio unit 100 are connected by a wire 112. The wire 112 is fixed to the upper steering shaft 12*a* and the universal joint 106 to rotate integrally. The spiral cable 110 has a length with a margin larger than the length of the wire wounded along with this rotation.

In the vehicle steering apparatus according to the fifth embodiment, the motor case on the motor 102 side is connected to the upper steering shaft 12*a* through the universal joint 106, and the spiral cable 110 is separated from the variable gear ratio unit 100 and mounted on the column portion 108. As a result, the variable gear ratio unit 100 can be made compact, and particularly the size in the axis direction can be reduced.

In the fifth embodiment, the motor 102 having a larger moment of inertia than that of the reducing unit 104 is located on the upper steering shaft 12*a* side. This can reduce the influence of the moment of inertia of the motor 102 on a steering wheel 10 during a change in rotation speed of the motor 102. That is, uncomfortable steering caused by the change of the rotation speed of the motor 102 can be eliminated. This is significant particularly in an apparatus in which the rotation amount of the lower steering shaft 12*b* is often larger than that of the upper steering shaft 12*a*.

Since the reducing unit 104 is located below the motor 102, grease can be prevented from entering the motor 102 from the reducing unit 104. The adverse effect of heat or the like generated by a power steering unit on the motor 102 can be reduced.

In the first and third embodiments, the motor case of the variable gear ratio unit on the motor side is connected to the lower end of the upper steering shaft 12*a,* and the motor case on the reducing unit side is connected to the upper end of the lower steering shaft 12*b*. If this relationship is reversed, however, the vehicle steering apparatus can operate similarly to the first and third embodiments.

In the second embodiment, the motor case 44 on harmonic drive reducing unit 75 side is connected to the lower end of the upper steering shaft 12*a,* and the motor case 44 on the motor 40 side is connected to the upper end of the lower steering shaft 12*b*. Even if this relationship is reversed, the vehicle steering apparatus can operate similarly to the second embodiment.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A vehicle steering apparatus comprising transmission ratio change means, arranged midway along a linear steering transmission system and located between a steering wheel and a steering gear box for connecting the steering wheel and a turned wheel, for changing a transmission ratio, and control means for variably controlling said transmission ratio change means in accordance with a state of a vehicle, said transmission ratio change means comprising:

a motor whose rotation is controlled by said control means; and a reducing mechanism for reducing a rotation speed of said motor, wherein a housing, which rotates based on the rotation of the steering wheel, for said motor and said reducing mechanism and a reduction output terminal of said reducing mechanism are connected to said steering transmission system, said motor and said reduction output terminal being axially aligned.

2. An apparatus according to claim 1, wherein said reducing mechanism has a high reduction ratio enough to decrease a phase shift amount between a steering angle of said steering wheel and a turning angle of said turned wheel with respect to a force reversely input from said turned wheel through said steering transmission system to be not more than a predetermined value.

3. An apparatus according to claim 1, wherein said reducing mechanism is a harmonic drive reducing unit.

4. An apparatus according to claim 1, wherein said reducing mechanism comprises a first reducing unit and a second reducing unit, a rotating shaft of said motor is connected to an input shaft of said first reducing unit, an output shaft of said first reducing unit is connected to an input shaft of said second reducing unit, and an output shaft of said second reducing unit serves as said output terminal of said reducing mechanism.

5. An apparatus according to claim 1, further comprising a connection portion for connecting said transmission ratio change means to said steering transmission system, said connection portion having a cylindrical yoke fixed to the body of said transmission ratio change means for coupling said transmission ratio change means to said steering transmission system, and holding means for holding a coupled state between said cylindrical yoke and said steering transmission system, wherein said holding means is detachably mounted on an outer circumferential surface of said cylindrical yoke.

6. An apparatus according to claim 1, further comprising a wire component for supplying power from a body side to said transmission ratio change means, wherein said wire component is disposed at a column portion supporting a steering shaft of said steering transmission system.

7. An apparatus according to claim 6, wherein said wire component is a spiral cable.

8. An apparatus according to claim 5, further comprising a wire component for supplying power from a body side to said transmission ratio change means, wherein said wire component is disposed on an outer circumferential surface of said cylindrical yoke between said holding means and the body of said transmission ratio change means.

9. An apparatus according to claim 8, wherein said wire component is a spiral cable.

* * * * *